(12) United States Patent
Skinkle (10) Patent No.: US 10,794,744 B2
(45) Date of Patent: Oct. 6, 2020

(54) FLOWMETER SENSOR WITH INTERCHANGEABLE FLOW PATH AND RELATED METHOD

(71) Applicant: Micro Motion, Inc., Boulder, CO (US)

(72) Inventor: David Skinkle, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/628,814

(22) PCT Filed: Jul. 18, 2017

(86) PCT No.: PCT/US2017/042523
§ 371 (c)(1),
(2) Date: Jan. 6, 2020

(87) PCT Pub. No.: WO2019/017891
PCT Pub. Date: Jan. 24, 2019

(65) Prior Publication Data
US 2020/0200582 A1    Jun. 25, 2020

(51) Int. Cl.
*G01F 1/84* (2006.01)

(52) U.S. Cl.
CPC .......... *G01F 1/8413* (2013.01); *G01F 1/8427* (2013.01); *G01F 1/8468* (2013.01)

(58) Field of Classification Search
CPC ....................................................... G01F 1/58
See application file for complete search history.

(56) References Cited

U.S. PATENT DOCUMENTS

| | | | | |
|---|---|---|---|---|
| 7,100,456 B2 * | 9/2006 | Bitto | ..................... | G01F 1/8413 73/861.356 |
| 7,178,407 B2 * | 2/2007 | Kappertz | ................ | G01F 1/588 73/861.11 |
| 7,938,020 B2 * | 5/2011 | Diederichs | .............. | G01F 1/584 73/861.12 |
| 8,316,722 B2 * | 11/2012 | Bitto | ..................... | G01F 1/8409 73/861.357 |
| 8,596,143 B2 * | 12/2013 | Rieder | .................. | G01F 1/8495 73/861.357 |

(Continued)

FOREIGN PATENT DOCUMENTS

DE    4026724 A1    3/1992

*Primary Examiner* — Jewel V Dowtin
(74) *Attorney, Agent, or Firm* — The Ollila Law Group LLC (57) ABSTRACT

A flowmeter (5) is provided. The flowmeter (5) has a wetted assembly (200) comprising one or more conduits (208, 208'), and at least one driver magnet (218, 218') attached to the one or more conduits (208, 208'). A dry assembly (202) houses a driver coil (224), and meter electronics (20) are in electrical communication with the driver coil (224). A case (236) at least partially covers the wetted assembly (200) and the dry assembly (202). The dry assembly (202) is removably attachable to the wetted assembly (200). The driver coil (224) is in magnetic communication with the at least one driver magnet (218, 218') when the dry assembly (202) is attached to the wetted assembly (200), and the driver coil (224) is configured to provide a vibratory signal to the at least one driver magnet (218, 218') when the dry assembly (202) is attached to the wetted assembly (200).

16 Claims, 6 Drawing Sheets

(56) References Cited

U.S. PATENT DOCUMENTS

| | | | | |
|---|---|---|---|---|
| 8,671,777 B2* | 3/2014 | Kolahi | ................. | G01F 1/8409 |
| | | | | 73/861.355 |
| 9,410,830 B2* | 8/2016 | Rovner | ................... | G01F 1/584 |
| 10,247,593 B2* | 4/2019 | Sulzer | ..................... | G01F 1/588 |
| 2009/0266177 A1* | 10/2009 | Hussain | ................ | G01F 1/8413 |
| | | | | 73/861.357 |
| 2016/0341582 A1* | 11/2016 | Lim | ........................ | G01F 1/586 |

\* cited by examiner

FLOWMETER SENSOR WITH INTERCHANGEABLE FLOW PATH AND RELATED METHOD

TECHNICAL FIELD

The present invention relates to flowmeters, and more particularly, to a flowmeter having an interchangeable wetted component group.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a flowmeter can be initially calibrated and a flow calibration factor along with a zero offset can be generated. In use, the flow calibration factor can be multiplied by the time delay measured by the pickoffs minus the zero offset to generate a mass flow rate. In most situations, the flowmeter is initially calibrated, typically by the manufacturer, and assumed to provide accurate measurements without subsequent calibrations required.

Vibrating sensors, including Coriolis flowmeters, are often employed in applications that subject the wetted components, such as conduits, for example, to process materials that are hazardous, toxic, or difficult to remove completely. This renders the wetted components non-reusable for other applications. In cases where there is a need to measure flow for a destructive process material for only several days or a few weeks, such as in a filling or dispensing environment, the cost for a complete meter is too high, and therefore the use of such a meter may not be practical. The present invention overcomes these and other problems and an advance in the art is achieved.

According to embodiments, a sensor is provided that is made up of two separate primary assemblies. The wetted assembly contains flow path components, and the dry assembly contains the electronics and related electrical hardware. Once the wetted assembly has been exposed to a destructive process material, the wetted assembly may be replaced with a new wetted assembly, while still utilizing the original dry assembly.

SUMMARY OF THE INVENTION

In an embodiment, a flowmeter comprises a wetted assembly that comprises one or more conduits and at least one driver magnet attached to the one or more conduits. A dry assembly houses a driver coil, and meter electronics are in electrical communication with the driver coil. A case at least partially covers the wetted assembly and the dry assembly. The dry assembly is removably attachable to the wetted assembly, and the driver coil is in magnetic communication with the at least one driver magnet when the dry assembly is attached to the wetted assembly. The driver coil is configured to provide a vibratory signal to the at least one driver magnet when the dry assembly is attached to the wetted assembly.

In an embodiment, a method of configuring a flowmeter is provided. The method comprises the steps of providing a dry assembly that houses a driver coil and providing a wetted assembly configured to receive a process material, wherein the wetted assembly comprises one or more conduits. At least one driver magnet is attached to the one or more conduits. Meter electronics is connected to the driver coil. A case at least partially covers the wetted assembly and the dry assembly. The wetted assembly is removably attached to the dry assembly, wherein the driver coil is in magnetic communication with the at least one driver magnet when the dry assembly is attached to the wetted assembly, and wherein the driver coil is configured to provide a vibratory signal to the at least one driver magnet when the dry assembly is attached to the wetted assembly.

ASPECTS

According to an aspect, a flowmeter, comprises: a wetted assembly comprising: one or more conduits, and at least one driver magnet attached to the one or more conduits. A dry assembly that houses a driver coil. Meter electronics is in electrical communication with the driver coil. A case that at least partially covers the wetted assembly and the dry assembly. The dry assembly is removably attachable to the wetted assembly, and wherein the driver coil is in magnetic communication with the at least one driver magnet when the dry assembly is attached to the wetted assembly, and wherein the driver coil is configured to provide a vibratory signal to the at least one driver magnet when the dry assembly is attached to the wetted assembly.

Preferably, the wetted assembly further comprises at least one pickoff magnet coupled to a conduit of the one or more conduits.

Preferably, the dry assembly houses a pickoff coil configured to receive a vibratory signal from the at least one pickoff magnet when the dry assembly is attached to the wetted assembly.

Preferably, the dry assembly houses a temperature sensor.

Preferably, the at least one driver magnet comprises: a first driver magnet coupled to a first conduit of the one or more conduits, and a second driver magnet coupled to a second conduit of the one or more conduits. The at least one pickoff magnet comprises: a first pickoff magnet coupled to the first conduit of the one or more conduits, and a second pickoff magnet coupled to the second conduit of the one or more conduits, and wherein the first driver magnet and first pickoff magnet are oriented in magnetic opposition to the second driver magnet and second pickoff magnet, respectively.

Preferably, the wetted assembly comprises an identifier and the dry assembly comprises a sensor configured to detect the identifier.

Preferably, the identifier is a visible identifier, and the sensor is an optical sensor.

Preferably, the identifier is an emitter, and the sensor is a receiver.

Preferably, the identifier comprises identifying information related to the wetted assembly.

Preferably, the dry assembly comprises at least one relief having a size and dimension to at least partially envelope at least one of the driver magnets and pickoff magnets.

According to an aspect, a method of configuring a flowmeter comprising the steps of: providing a dry assembly that houses a driver coil, and providing a wetted assembly configured to receive a process material, wherein the wetted assembly comprises one or more conduits. At least one driver magnet is attached to the one or more conduits. Meter electronics is connected to the driver coil. The wetted assembly and the dry assembly are at least partially covered with a case. The wetted assembly is removably attached to the dry assembly, wherein the driver coil is in magnetic communication with the at least one driver magnet when the dry assembly is attached to the wetted assembly, and wherein the driver coil is configured to provide a vibratory signal to the at least one driver magnet when the dry assembly is attached to the wetted assembly.

Preferably, the method comprises attaching at least one pickoff magnet to a conduit of the at least one conduit.

Preferably, the dry assembly houses a pickoff coil configured to receive a vibratory signal from the at least one pickoff magnet when the dry assembly is attached to the wetted assembly.

Preferably, the dry assembly comprises a temperature sensor.

Preferably, the step of attaching at least one driver magnet to the one or more conduits comprises: attaching a first driver magnet to a first conduit of the one or more conduits, and attaching a second driver magnet to a second conduit of the one or more conduits. The step of attaching at least one pickoff magnet to a conduit of the at least one conduit comprises: attaching a first pickoff magnet to the first conduit of the one or more conduits, and attaching a second pickoff magnet to the second conduit of the one or more conduits. The first driver and first pickoff magnets are oriented in magnetic opposition to the second driver and second pickoff magnets, respectively.

Preferably, the method comprises transmitting identifying information from the wetted assembly to meter electronics.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
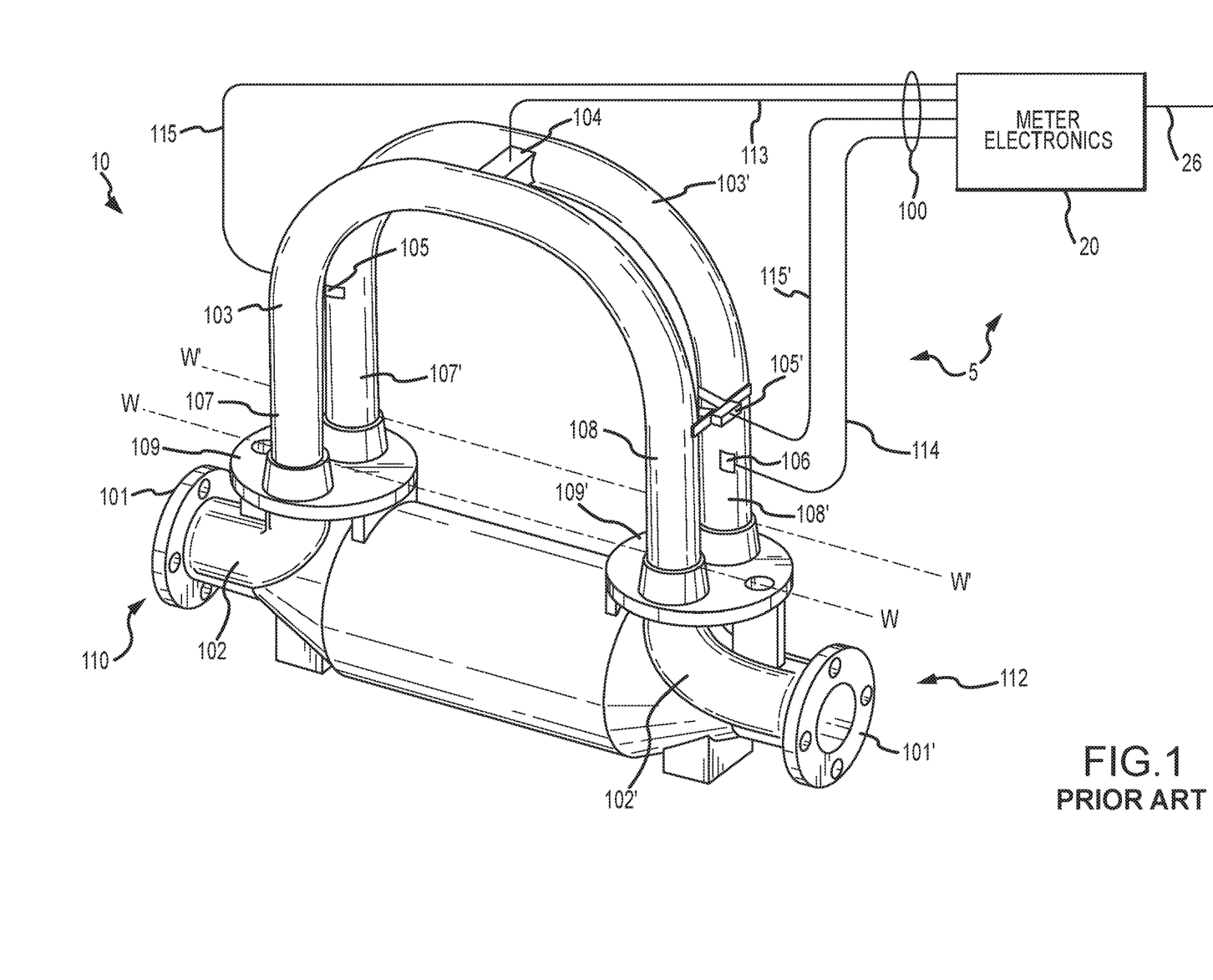
FIG. 1 illustrates a prior art sensor assembly.

FIG. 1 illustrates a prior art flowmeter 5, which can be any vibrating meter, such as a Coriolis flowmeter or densitometer, for example without limitation. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. The sensor assembly 10 includes flanges 101 and 101', a pair of manifolds 102 and 102', a pair of parallel conduits 103 (first conduit) and 103' (second conduit), a driver 104, a temperature sensor 106 such as a resistive temperature detector (RTD), and a pair of pickoffs 105 and 105', such as magnet/coil pickoffs, strain gages, optical sensors, or any other pickoff known in the art. The conduits 103 and 103' have inlet legs 107 and 107' and outlet legs 108 and 108', respectively. Conduits 103 and 103' bend in at least one symmetrical location along their length and are essentially parallel throughout their length. Each conduit 103, 103', oscillates about axes W and W', respectively.

The legs 107, 107', 108, 108' of conduits 103, 103' are fixedly attached to conduit mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101, and is conducted through the manifold 102 to conduit mounting block 109. Within the manifold 102, the material is divided and routed through conduits 103 and 103'. Upon exiting conduits 103 and 103', the process material is recombined in a single stream within manifold 102' and is thereafter routed to exit a second end 112 connected by flange 101' to the process line (not shown).

Conduits 103 and 103' are selected and appropriately mounted to the conduit mounting blocks 109 and 109' so as to have substantially the same mass distribution, moments of inertia, and Young's modulus about bending axes W-W and W'-W', respectively. Inasmuch as the Young's modulus of the conduits 103, 103' changes with temperature, and this change affects the calculation of flow and density, a temperature sensor 106 is mounted to at least one conduit 103, 103' to continuously measure the temperature of the conduit. The temperature of the conduit, and hence the voltage appearing across the temperature sensor 106 for a given current passing therethrough, is governed primarily by the temperature of the material passing through the conduit. The temperature-dependent voltage appearing across the temperature sensor 106 is used in a well-known method by meter electronics 20 to compensate for the change in elastic modulus of conduits 103, 103' due to any changes in conduit 103, 103' temperature. The temperature sensor is connected to meter electronics 20.

Both conduits 103,103' are driven by driver 104 in opposite directions about their respective bending axes W and W' at what is termed the first out-of-phase bending mode of the flowmeter. This driver 104 may comprise any one of many well-known arrangements, such as a magnet mounted to conduit 103' and an opposing coil mounted to conduit 103, through which an alternating current is passed for vibrating both conduits. A suitable drive signal is applied by meter electronics 20, via lead 113, to the driver 104. It should be appreciated that while the discussion is directed towards two conduits 103, 103', in other embodiments, only a single conduit may be provided or more than two conduits may be provided. It is also within the scope of the present invention to produce multiple drive signals for multiple drivers.

Meter electronics 20 receive the temperature signal on lead 114, and the left and right velocity signals appearing on leads 115 and 115', respectively. Meter electronics 20 produce the drive signal appearing on lead 113 to driver 104 and vibrate conduits 103, 103'. Meter electronics 20 process the left and right velocity signals and the temperature signal to compute the mass flow rate and the density of the material passing through the sensor assembly 10. This information, along with other information, is applied by meter electronics 20 over path 26 to utilization means. An explanation of the circuitry of the meter electronics 20 is not needed to understand the present invention and is omitted for brevity of this description. It should be appreciated that the description of FIG. 1 is provided merely as an example of the operation of one possible vibrating meter and is not intended to limit the teaching of the present invention.

A Coriolis flowmeter structure is described although it will be apparent to those skilled in the art that the present invention could be practiced on a vibrating tube densitometer without the additional measurement capability provided by a Coriolis mass flowmeter.

Figure 2:
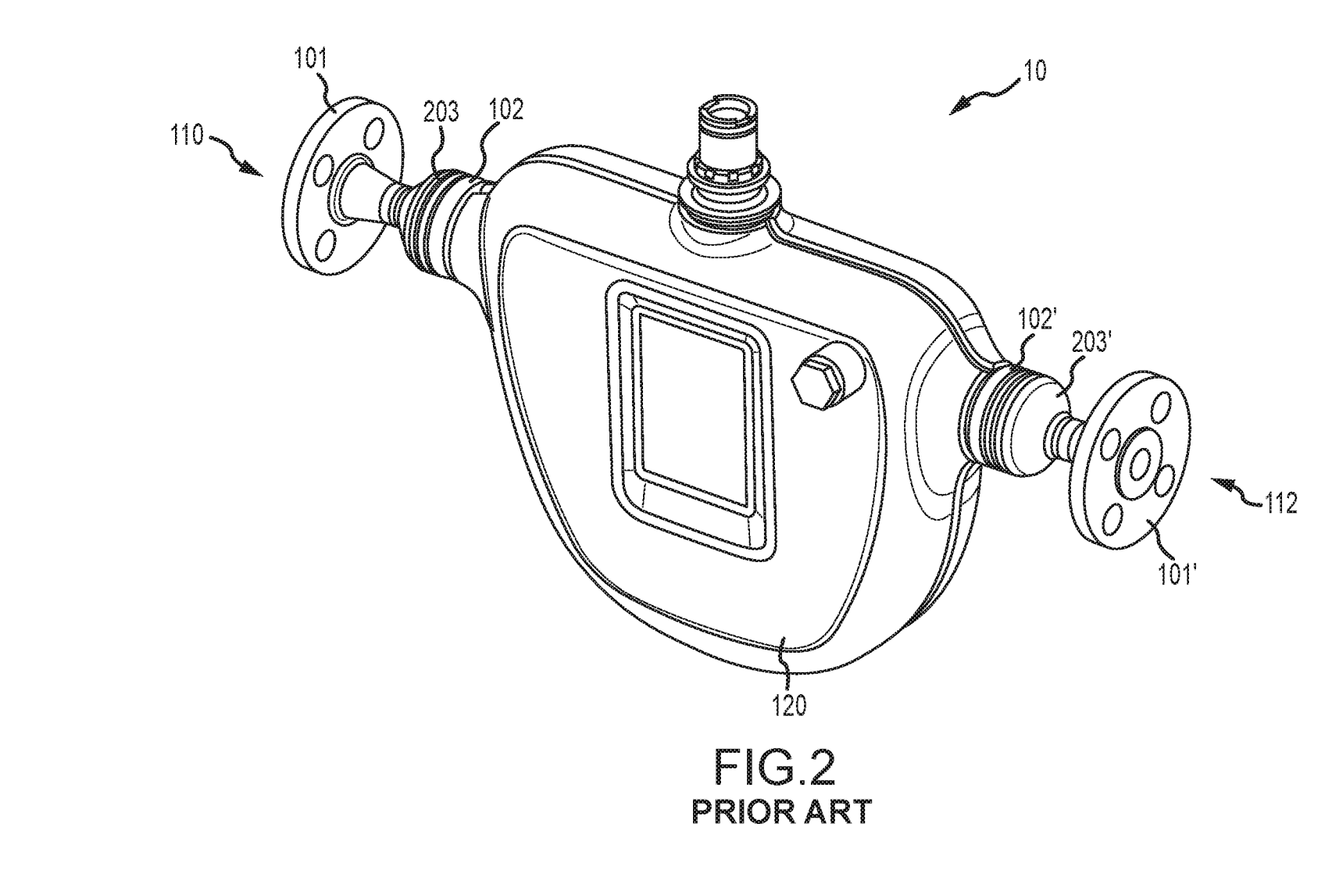
FIG. 2 illustrates a prior art sensor assembly having a case.

FIG. 2 illustrates an embodiment of a prior art sensor assembly 10 that is encased by a case 120. Much of the sensor assembly 10 is hidden from view by the case 120, but the manifolds 102, 102', and flanges 101, 101' are visible. In this embodiment, adapters 203, 203' are welded to connect the flanges 101, 101' to their respective manifolds 102, 102'. A process line (not shown) would be connected to the flanges 101, 101' for typical use.

Figure 3:
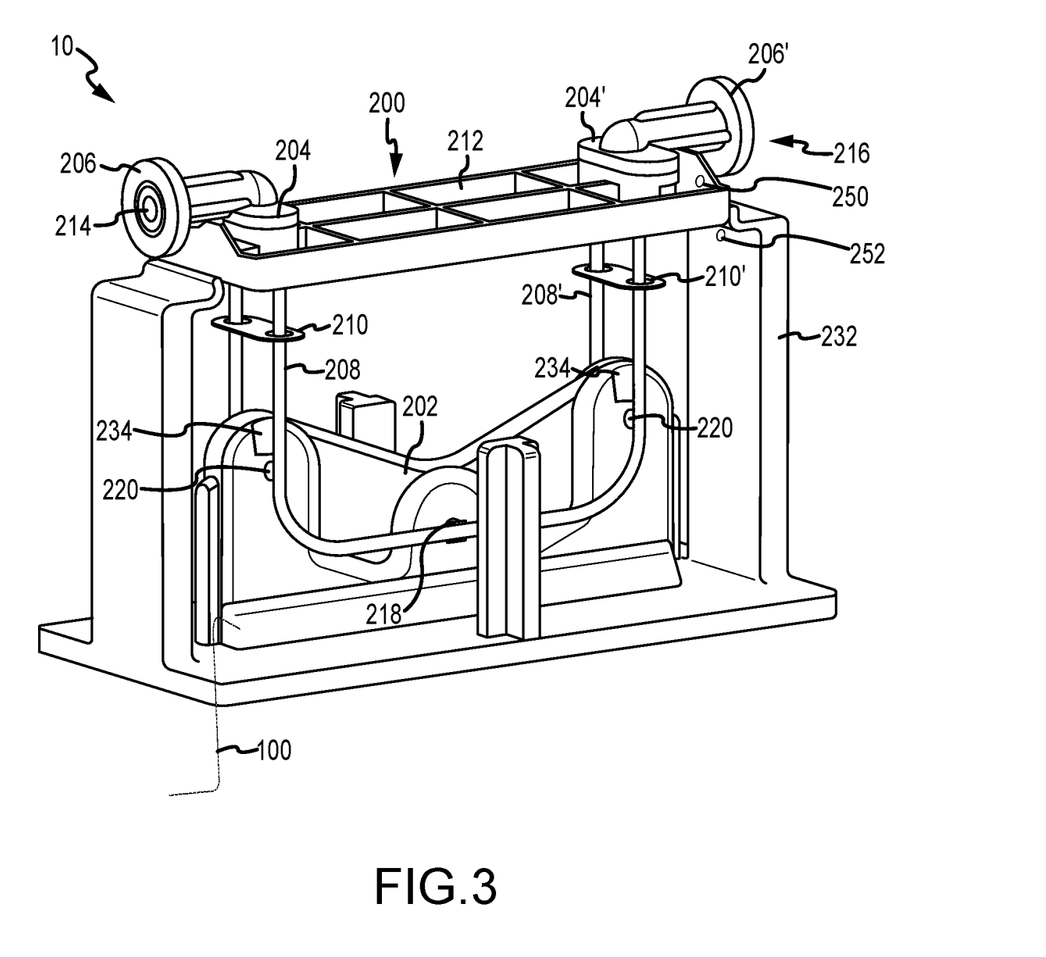
FIG. 3 illustrates a sensor assembly on a mounting portion according to an embodiment.

FIG. 3 illustrates a sensor assembly 10 according to an embodiment. Elements of the sensor assembly 10 may not be illustrated for clarity. Additional covers or casings are absent for clarity. The sensor assembly 10 comprises a wetted assembly 200—see also FIG. 4—and a dry assembly 202. The wetted assembly 200 comprises the flow path and, for example, manifolds 204, 204', flanges 206, 206' or other process connections, and conduits 208, 208'. The wetted assembly 200 is the portion of the sensor assembly 10 that is directly exposed to process materials, such as manifolds 204, 204', flanges 206, 206', and conduits 208, 208', for example. Other portions of the wetted assembly 200 may include brace bars 210, 210' and a base plate 212 that may or may not have direct exposure to process materials. It should be noted that the description and figures illustrate a dual conduit system, but this is not limiting, as flowmeters with a single conduit or a number of conduits greater than two are also contemplated.

The driver magnets 218, 218' and pickoff magnets 220, 220' are coupled to the conduits 208, 208'. It should be noted that the first driver magnet 218 and first pickoff magnet 220 are oriented in magnetic opposition to the second driver magnet 218' and second pickoff magnet 220'. Not all magnets are visible in FIG. 3.

The dry assembly 202 is removably attachable to the wetted assembly 200. In operation, a process material would enter the wetted assembly 200 through an inlet 214 of flange 206, pass through a manifold 204, into the conduits 208, 208', and exit through the outlet 216 of flange 206' via another manifold 204'. The dry assembly 202, as the name implies, is never in contact with process material.

Figure 4:
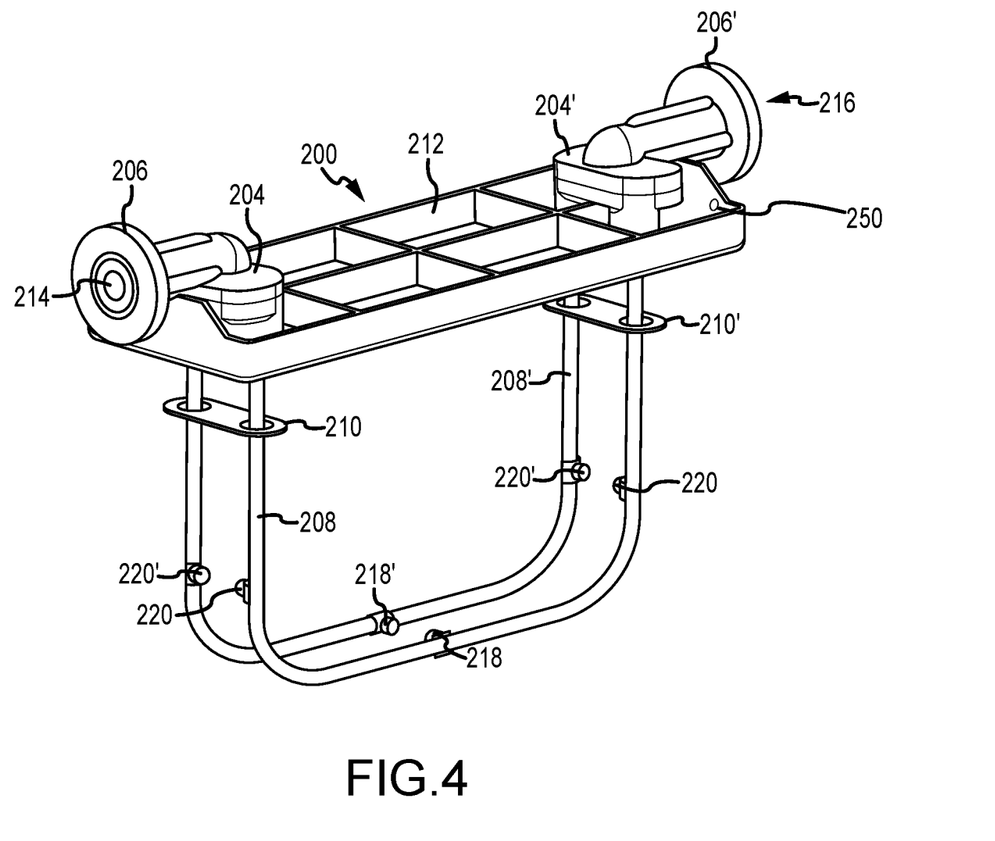
FIG. 4 illustrates a sensor assembly according to an embodiment.

The dry assembly 202 comprises the electrical components of the sensor assembly 10. These components may be sensitive to moisture or other caustic characteristics of the process material, so it is advantageous that the dry assembly 202 not receive any contact with the process material. In an embodiment, a feedthrough allows leads 100 to establish communication between meter electronics 20 and electronic elements housed in the dry assembly, such as coils 222, 224 and temperature sensors 228. In another embodiment, meter electronics 20 are housed within the dry assembly 202, and the leads 100 shown in FIG. 3 would instead be a communications path 26. With continuing reference to FIGS. 3 and 4 in addition to FIG. 5, it can be seen that a pickoff coil 222 resides in the dry assembly 202, which is partitioned from the wetted assembly 200. The dry assembly 202 may also house a driver coil 224, a temperature sensor 228, and any other wires and associated electronics. A relief 230 may be defined by the partition that allows the magnets 218, 218', 220, 220' to protrude therein. This allows the magnets 218, 218', 220, 220' to be in closer proximity to their respective coil 222, 224 to maximize magnetic engagement between each magnet/coil set.

Figure 5:
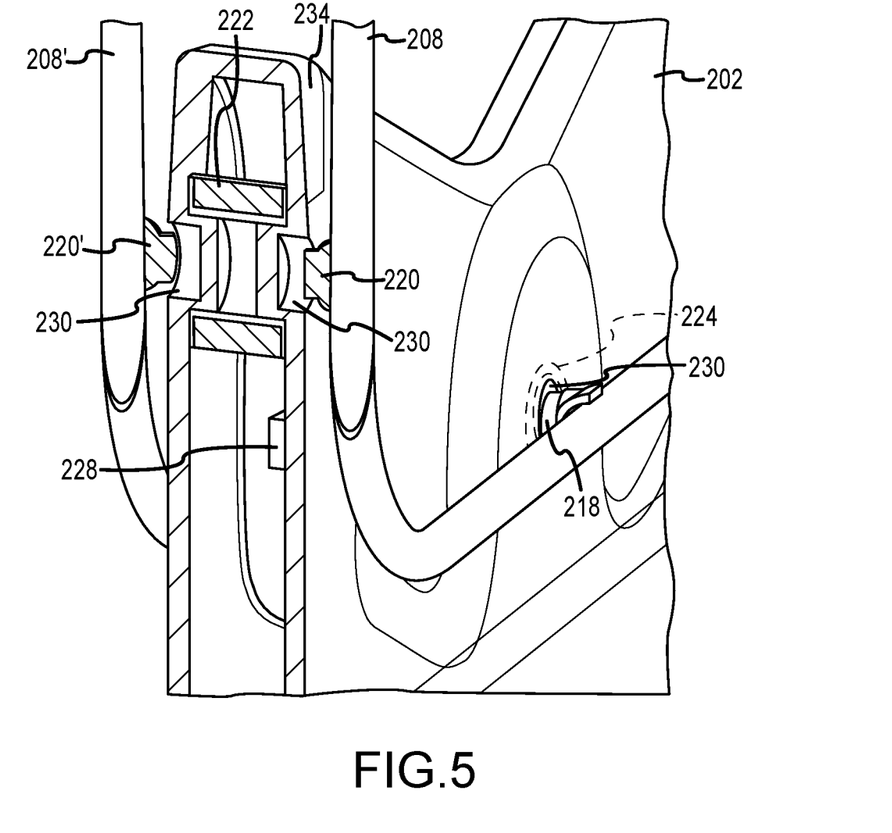
FIG. 5 illustrates a cross sectional view of a sensor assembly according to an embodiment.

An alternating current is passed through the driver coil 224, which creates a magnetic field that interacts with the driver magnets 218, 218', which in turn vibrates both conduits 208, 208'. A suitable drive signal is applied by meter electronics 20 as described above. Similarly, the vibratory motion of the pickoff magnets 220, 220' induces a current in each pickoff coil 222. The magnetic poles are oriented so the force caused by the driver coil 224 is opposing on the conduits 208, 208'. Specifically, one conduit 208 will have all magnetic south poles oriented towards the coils, while the other conduit 208' will have all north poles oriented towards the coils. Thus, when an alternating current is passed through the driver coil 224, the first conduit 208 will deflect towards the dry assembly 202, while the second conduit 208' will deflect away from the dry assembly 202 or vice versa.

In an alternate embodiment, the coils 222, 224 may be oriented to the outside of the magnets. This would be implemented in a similar way to that illustrated herein, but with projections that emanate from the dry assembly 202 that provide clearance for the conduits. In yet another embodiment, dual coils may be provided for both the driver and pickoffs, which would necessitate a larger dry assembly 202 to provide clearance for the dual coils at each position. Furthermore, combinations of a single coil at the drive and dual coil at pick-offs are also contemplated.

The dry assembly 202 may comprise a mounting portion 232. The mounting portion 232 may support at least one of the flanges 206, 206', the manifolds 204, 204', the flow tubes 208, 208', the brace bars 210, 210', and the base plate 212. The size and dimension of the mounting portion 232 may therefore differ from embodiment to embodiment of flowmeter based upon flowmeter size, conduit orientation, and general flowmeter specifications. In the embodiment illustrated, the base plate rests upon the mounting portion 232. It will be clear that the wetted assembly 200 is easily added or removed from the dry assembly 202. Therefore, if the wetted assembly 200 is damaged or rendered unusable for a particular application, it may be removed from the dry assembly 202 and replaced by a different wetted assembly 200. In prior art flowmeters, replacing the entire meter is necessary when conduits are damaged, and the present embodiments provide a far less costly solution to replace conduits without the need for replacing expensive electronic components.

To aid loading a conduit set 208, 208', deflecting ramps 234 may be provided that may displace the magnets slightly outward to facilitate installation and to ensure that conduits 208, 208' are deformed within predetermined tolerance limits. An ejection mechanism may also be provided that would slightly displace the tubes to allow conduit set 208, 208' removal.

Figure 6:
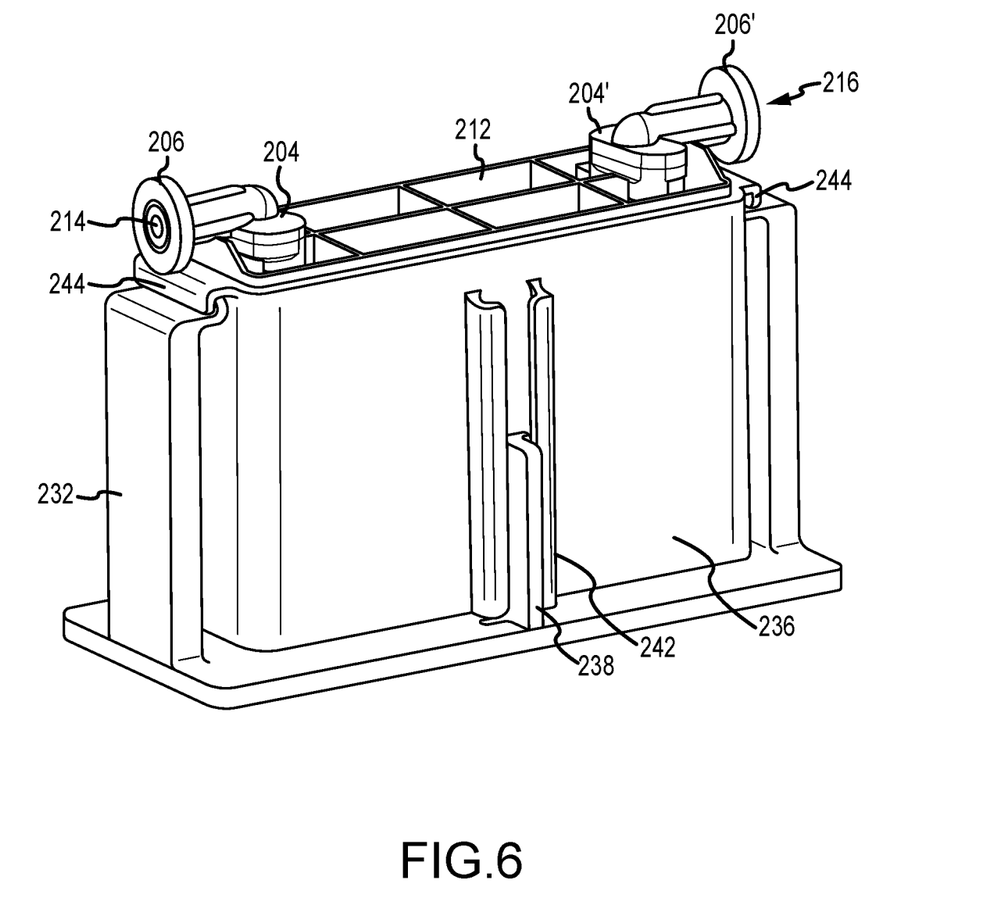
FIG. 6 illustrates a sensor assembly and a case according to an embodiment.

FIG. 6 illustrates a case 236 that may be provided to protect portions of the wetted and dry assemblies 200, 202. In an embodiment, a mounting rail 238 engages a retaining member 242 on the case 236. The retaining member 242 may comprise clips, detents, pins, springs, tabs, threaded hardware, non-threaded hardware, combinations thereof, and/or any other mechanical fastening means known in the art. In some embodiments, spring members (not shown) may also preload the case 236 to prevent undesirable vibrations. In some embodiments, fastening members may also attach the case 236 to a plurality of points on the sensor assembly and/or mounting portion 232 to prevent undesirable vibrations.

The materials for the wetted and dry assemblies 200, 202 may comprise metals, plastics, printed materials, composites, ceramics, and combinations thereof. Clips, detents, pins, springs, tabs 244 (illustrated), threaded hardware, non-threaded hardware, combinations thereof, and/or any other mechanical fastening means known in the art may also be utilized in attaching the dry assembly 202, including the mounting portion 232, to the case 236 and/or the wetted assembly 200, including the base plate 212. Bonding agents, adhesives, welding, and/or brazing may be employed in construction.

In some embodiments, the wetted assembly 200 comprises an identifier. The identifier 250 may be a visual indicator that identifies at least one of the model number, other identifying information, specifications, and/or calibration information. In an embodiment, the dry assembly 202 comprises a sensor 252 configured to receive information from the identifier 250. For example, the identifier 250 may be an electronic identifier, active emitter, passive emitter, and the sensor 252 may receive a signal or otherwise read the identifier 250 such that identifying information such as at least one of the model number, other identifying information, specifications, and/or calibration information is received by the sensor 252. This information may be communicated to meter electronics 20. Meter electronics may store this information. Meter electronics may utilize calibration information to more accurately calculate flowmeter-related values. Meter electronics may provide a warning if the wetted assembly 200 is not compatible with the dry assembly 202.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

I claim:

1. A flowmeter (5), comprising:
a wetted assembly (200) comprising:
one or more conduits (208, 208'); and
at least one driver magnet (218, 218') attached to the one or more conduits (208, 208');
a dry assembly (202) that houses a driver coil (224);
meter electronics (20) in electrical communication with the driver coil (224);
a case (236) that at least partially covers the wetted assembly (200) and the dry assembly (202); and
wherein the dry assembly (202) is removably attachable to the wetted assembly (200), and wherein the driver coil (224) is in magnetic communication with the at least one driver magnet (218, 218') when the dry assembly (202) is attached to the wetted assembly (200), and wherein the driver coil (224) is configured to provide a vibratory signal to the at least one driver magnet (218, 218') when the dry assembly (202) is attached to the wetted assembly (200).

2. The flowmeter (5) of claim 1, wherein the wetted assembly (200) further comprises:
at least one pickoff magnet (220, 220') coupled to a conduit of the one or more conduits (208, 208').

3. The flowmeter (5) of claim 2, wherein the dry assembly (202) houses a pickoff coil (222) configured to receive a vibratory signal from the at least one pickoff magnet (220, 220') when the dry assembly (202) is attached to the wetted assembly (200).

4. The flowmeter (5) of claim 2, wherein the dry assembly (202) houses a temperature sensor (228).

5. The flowmeter (5) of claim 2, wherein:
the at least one driver magnet (218, 218') comprises:
a first driver magnet (218) coupled to a first conduit of the one or more conduits (208, 208'); and
a second driver magnet (218') coupled to a second conduit of the one or more conduits (208, 208');
wherein the at least one pickoff magnet (220, 220') comprises:
a first pickoff magnet (220) coupled to the first conduit of the one or more conduits (208, 208'); and
a second pickoff magnet (220') coupled to the second conduit of the one or more conduits (208, 208'); and
wherein the first driver magnet and first pickoff magnet (218, 220) are oriented in magnetic opposition to the second driver magnet and second pickoff magnet (218', 220'), respectively.

6. The flowmeter (5) of claim 1, wherein the wetted assembly (200) comprises an identifier (250) and the dry assembly comprises a sensor (252) configured to detect the identifier (250).

7. The flowmeter (5) of claim 6, wherein the identifier (250) is a visible identifier, and the sensor (252) is an optical sensor.

8. The flowmeter (5) of claim 6, wherein the identifier (250) is an emitter, and the sensor (252) is a receiver.

9. The flowmeter (5) of claim 6, wherein the identifier (250) comprises identifying information related to the wetted assembly (200).

10. The flowmeter (5) of claim 2, wherein the dry assembly (202) comprises at least one relief (230) having a size and dimension to at least partially envelope at least one of the driver magnets (218, 218') and pickoff magnets (220, 220').

11. A method of configuring a flowmeter, comprising the steps of:
providing a dry assembly that houses a driver coil;
providing a wetted assembly configured to receive a process material, wherein the wetted assembly comprises one or more conduits;
attaching at least one driver magnet to the one or more conduits;
connecting meter electronics to the driver coil;
at least partially covering the wetted assembly and the dry assembly with a case; and
removably attaching the wetted assembly to the dry assembly, wherein the driver coil is in magnetic communication with the at least one driver magnet when the dry assembly is attached to the wetted assembly, and wherein the driver coil is configured to provide a vibratory signal to the at least one driver magnet when the dry assembly is attached to the wetted assembly.

12. The method claim of 11, comprising attaching at least one pickoff magnet to a conduit of the at least one conduit.

13. The method claim of 12, wherein the dry assembly houses a pickoff coil configured to receive a vibratory signal from the at least one pickoff magnet when the dry assembly is attached to the wetted assembly.

14. The method claim of 11, wherein the dry assembly comprises a temperature sensor.

15. The method claim of 12, wherein:
the step of attaching at least one driver magnet to the one or more conduits comprises:
attaching a first driver magnet to a first conduit of the one or more conduits; and
attaching a second driver magnet to a second conduit of the one or more conduits;
wherein the step of attaching at least one pickoff magnet to a conduit of the at least one conduit comprises:
attaching a first pickoff magnet to the first conduit of the one or more conduits; and
attaching a second pickoff magnet to the second conduit of the one or more conduits; and
orienting the first driver and first pickoff magnets in magnetic opposition to the second driver and second pickoff magnets, respectively.

16. The method claim of 11, comprising transmitting identifying information from the wetted assembly to meter electronics.

* * * * *